United States Patent

Arai et al.

[11] Patent Number: 6,008,606
[45] Date of Patent: Dec. 28, 1999

[54] STARTING ASSISTANCE DEVICE FOR A VEHICLE WITH A MOTOR AND DOG-CLUTCH CONTROL FOR TRANSMITTING A TORQUE TO IDLER WHEELS

[75] Inventors: Kentaro Arai; Tetsuro Hamada; Shigenobu Sekiya, all of Tochigi-ken, Japan

[73] Assignee: Honda Giken Kogyo Kabushiki Kaisha, Tokyo, Japan

[21] Appl. No.: 09/154,745

[22] Filed: Sep. 17, 1998

[30] Foreign Application Priority Data

Sep. 18, 1997 [JP] Japan .................................. 9-253410

[51] Int. Cl.⁶ ...................................................... H02P 1/04
[52] U.S. Cl. ........................ 318/431; 318/430; 290/38 R; 290/48
[58] Field of Search ..................................... 318/445–447, 318/452, 453, 466, 488, 430, 431; 290/38 R, 48

[56] References Cited

U.S. PATENT DOCUMENTS

| 4,351,405 | 9/1982 | Fields et al. ............................... 180/65 |
| 5,301,764 | 4/1994 | Gardner .................................. 180/65.2 |
| 5,346,031 | 9/1994 | Gardner .................................. 180/179 |
| 5,819,194 | 10/1998 | Hara et al. ............................... 701/89 |

*Primary Examiner*—Robert E. Nappi
*Assistant Examiner*—Rita Leykin
*Attorney, Agent, or Firm*—Armstrong, Westerman, Hattori, McLeland & Naughton

[57] ABSTRACT

A starting assistance device for a vehicle has an electric motor and a dog clutch which is switched on at the time of starting of the vehicle to thereby transmit a torque to idler wheels. A sensor is provided to detect the switching on and switching off of the dog clutch. In case the switching off of the dog clutch is not detected when the rotational speeds of the idler wheels have exceeded a predetermined value after the starting of the vehicle, the electric motor is driven in such a direction of rotation so as to cancel the torque which operates on the dog clutch due to the frictional force in the electric motor.

2 Claims, 4 Drawing Sheets

STARTING ASSISTANCE DEVICE FOR A VEHICLE WITH A MOTOR AND DOG-CLUTCH CONTROL FOR TRANSMITTING A TORQUE TO IDLER WHEELS

BACKGROUND OF THE INVENTION

1. Technical Field of the Invention

The present invention relates to a starting assistance device for mounting on a vehicle in which either the front wheels or the rear wheels are driving wheels which are driven by an engine and the remaining thereof (i.e., the rear wheels or the front wheels whichever the case may be) are idler wheels.

2. Description of the Related Art

A conventional starting assistance device is one which performs the starting assistance of a vehicle at the time of starting on a slippery road (such as, a snowy road or the like) by driving idler wheels with an electric motor. In this prior art, for the electric motor, it is desired to use an inexpensive DC brush motor which is used as a self-starter motor. However, if the electric motor remains coupled to the idler wheels also after the starting of the vehicle, the electric motor will be excessively rotated (or rotated at too high a rotating speed) by counter driving by the idler wheels. The durability of the brushes will therefore be impaired.

As a solution, the following structural arrangement is provided. Namely, there is provided a dog clutch which is switched on at the time of starting of the vehicle to thereby transmit the torque of the electric motor to the idler wheels. Once the vehicle has started, the driving of the electric motor is stopped and also the dog clutch is switched off.

If a DC brush motor is used as the electric motor, there will occur a frictional force by the friction of the brushes. Even if the driving of the electric motor is stopped, there will be operated on the dog clutch a torque which is equivalent to the frictional torque in the electric motor as a result of counter driving from the idler wheels. By the friction on the tooth side surfaces of the dog clutch, the dog clutch is locked to the switched-on condition (also called a switch-on locking) and therefore cannot be switched off any more. In such a case, the electric motor is excessively rotated as a result of counter driving by the idler wheels after vehicle has started, thereby resulting in the durability of the electric motor being impaired.

In view of the above-described disadvantages or drawbacks of the conventional devices, the present invention has an object of providing a starting assistance device in which the dog clutch can surely be switched off after the starting of the vehicle.

SUMMARY OF THE INVENTION

In order to attain the above-described object, the present invention is a starting assistance device for mounting on a vehicle in which either front wheels or rear wheels are driven by an engine and the remaining thereof are idler wheels. Such device includes an electric motor; and a dog clutch which is switched on at the time of starting of the vehicle to transmit an output torque of the electric motor to the idler wheels, wherein, after the vehicle has started, the electric motor ceases to be driven and the dog clutch is switched off. The improvement in this invention is in having clutch detecting means for detecting switching on and switching off of the dog clutch; and a temporary driving means for temporarily driving the electric motor in a direction to cancel a torque which operates on the dog clutch due to a frictional force in the electric motor, the temporary driving of the electric motor being performed when switching off of the dog clutch is not detected by the clutch detecting means even when the rotational speed of the idler wheels has exceeded a predetermined value after the starting of the vehicle.

In this manner, by temporarily driving the electric motor, the torque ceases to operate on the dog clutch. The switch-on locking due to the friction on the tooth side surfaces of the dog clutch is released, and the dog clutch is switched off.

In order to release the switch-on locking, the electric motor must be rotated in the direction of counter driving by the idler wheels. However, in order to discriminate the direction of rotation, a special sensor is required, resulting in a higher cost. In this case, if the temporary driving means is constituted to drive the electric motor in a normal direction and in a reverse direction within a temporary driving time, the switch-on locking of the dog clutch is released at the time when the direction of rotation of the electric motor coincides with the direction of counter driving by the idler wheels. Therefore, a special sensor to discriminate the direction of rotation becomes unecessary, resulting in a smaller cost.

DETAILED DESCRIPTION OF PREFERRED EMBODIMENTS

Figure 1:
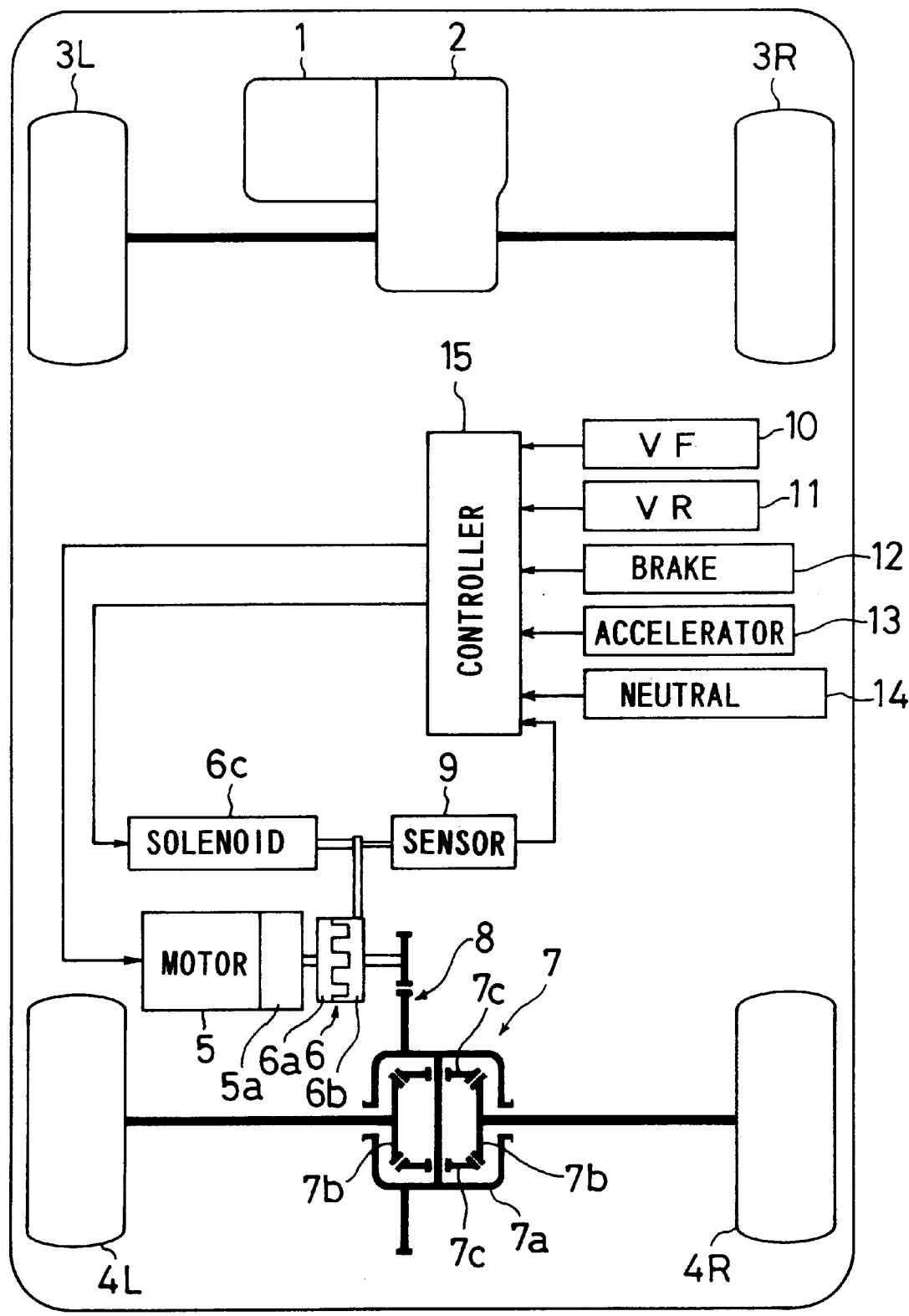
FIG. 1 is a skeleton diagram showing a first embodiment of the present invention.

FIG. 1 shows a front-wheel-drive vehicle in which the left and right front wheels 3L, 3R are driven by an engine 1 via a transmission 2. Left and right rear wheels 4L, 4R, which are idler wheels, are capable of being driven by an electric motor 5 via a dog clutch 6 and a differential gear 7.

The electric motor 5 is constituted by a direct current (DC) brush motor which has a built-in reduction gear 5a. The differential gear 7 is constituted by a bevel gear type of differential gear which is made up of: a pair of left and right side gears 7b, 7b comprising bevel gears; a pair of pinions 7c, 7c which are geared with both the side gears 7b, 7b; and a differential gear case 7a which rotatably supports inside thereof the side gears 7b, 7b and the pinions 7c, 7c. The left and right rear wheels 4L, 4R are coupled to both the side gears 7b, 7b. The dog clutch 6 is made up of: a stationary dog 6a which is coupled to the electric motor 5; a movable dog 6b which is coupled to the differential gear case 7a via a gear train 8 and which can be engaged with, and disengaged from, the stationary dog 6a; and a solenoid 6c which moves the movable dog 6b back and forth. When the solenoid 6c is energized or charged with electricity, the movable dog 6b is engaged or geared with the stationary dog 6a, whereby the dog clutch 6 is switched on. When the energizing of the solenoid 6c is stopped, the movable dog 6b is released from the stationary dog 6a by the urging force of a spring (not illustrated) which is built in the solenoid 6c, whereby the dog clutch 6 is switched off. A stroke sensor 9 is connected to the movable dog 6c. This sensor 9 constitutes a clutch detecting means which detects the switching on and switching off of the dog clutch 6.

The electric motor 5 and the solenoid 6c are controlled by a controller 15 which receives as input signals from the following: i.e., front-wheel speed sensors 10 for detecting the rotational speeds VF of the front wheels 3L, 3R; rear-wheel speed sensors 11 for detecting the rotational speeds VF of the rear wheels 4L, 4R; a brake switch 12; an accelerator switch 13; a neutral switch 14 which detects whether the transmission 2 is in the neutral state or not; and the above-described stroke sensor 9.

Figure 2:
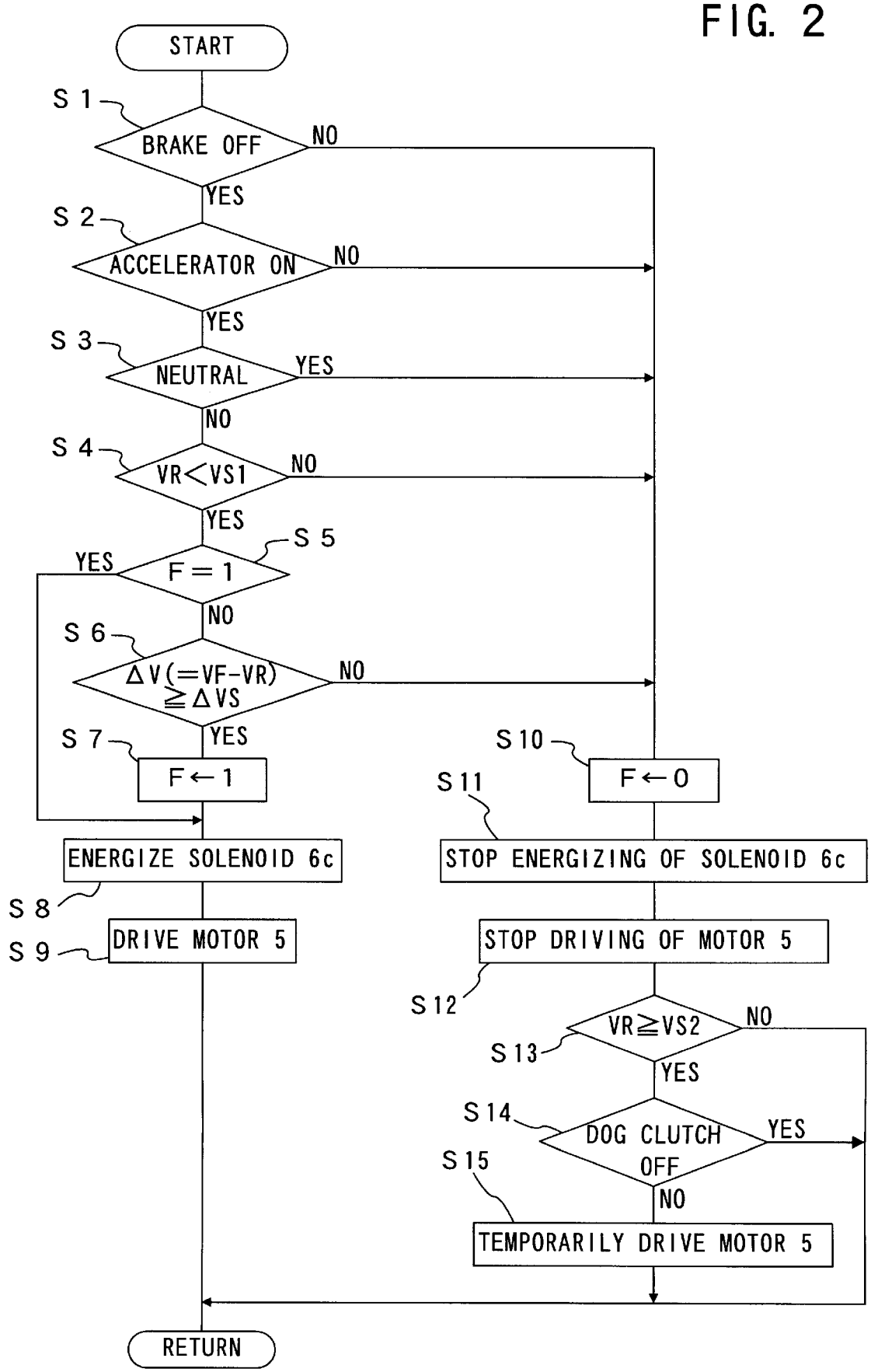
FIG. 2 is a flow chart showing a control program for starting assistance.

The contents of the control are as shown in FIG. 2. A judgement is made that the vehicle is at the time of starting when the following four conditions have been met: i.e., the brake is off (S1); the accelerator pedal is pressed on (S2); the transmission 2 is in a non-neutral state (S3); and the rear-wheel rotational speeds VR are below a predetermined value VS1 (e.g., below 10 km/h) which is a basis for Judging whether the vehicle is at the time of starting or not (S4). If the vehicle has been judged to be at the time of starting, a discrimination is made as to whether a starting assistance flag F is set to "1" or not (S5). If F=0, a discrimination is made as to whether the difference ΔV between the front-wheel rotational speeds VF and the rear-wheel rotational speeds VR is above a predetermined reference value ΔVS or not (S6). If ΔV≧ΔVS, based on a judgement that the front wheels are slipping, the starting assistance flag F is set to "1" (S7). The solenoid 6c is then energized to thereby switch on the dog clutch 6 (S8), and the electric motor 5 is driven (S9). According to these operations, the output torque of the electric motor 5 is transmitted to the left and right rear wheels 4L, 4R via the dog clutch 6, the gear train 8, and the differential gear 7. The rear wheels 4L, 4R are thus driven to perform the starting assistance.

If the condition of VR≧VS1 has been satisfied after the starting of the vehicle, the starting assistance flag F is reset to "0" (S10). The energizing of the solenoid 6c is stopped to switch off the dog clutch 6 (S11) and the driving of the electric motors is stopped (S12).

In the electric motor 5 there occurs a frictional force due to the friction by the brushes. In a state in which the vehicle recedes (or moves backward) at the time of starting on an upward slope due to lack of power even if the electric motor 5 is driven, whereby the electric motor 5 is counter-driven by the rear wheels 4L, 4R, a torque equivalent to the frictional force in the electric motor 5 is operated on the dog clutch 6 even if the driving of the electric motor 5 is stopped. As a result of this torque, the tooth side surfaces of the stationary dog 6a and the movable dog 6b are brought into forcible contact with each other. Due to the friction between the tooth side surfaces, the movable dog 6b will no longer be released out of engagement with the stationary dog 6a by the force of the spring alone. As a result, even if the energizing of the solenoid 6c is stopped, the dog clutch 6 will remain switched on. If the locking of the dog clutch 6 to the switched-on condition ("switch-on locking" of the dog clutch 6) occurs as described above, the electric motor 5 will be rotated by the rotation of the rear wheels 3L, 3R at a speed increased by the gear ratios of the gear train 8 and the reduction gear 5a. When the vehicle speed becomes high, the electric motor 5 rotates at an excessive rotational speed, thereby giving a bad effect on the durability of the electric motor 5.

Figure 3:
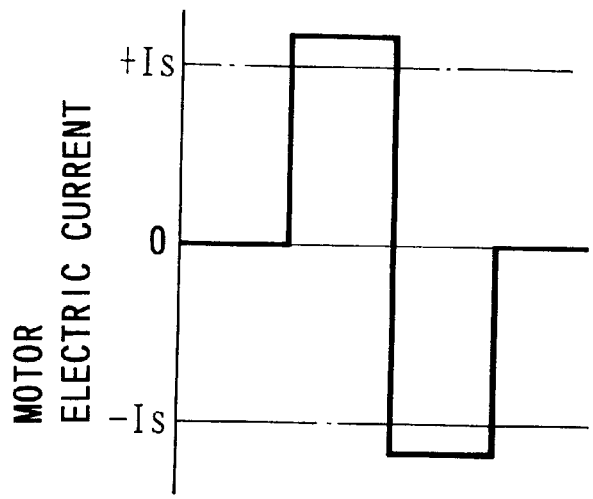
FIG. 3 is a graph showing an electric motor current to flow at the time of temporary driving of the electric motor.

As a solution, in the present embodiment, when the rear-wheel rotational speeds VR have exceeded a predetermined value VS2 (S13), a discrimination is made based on the signal from the stroke sensor 9 as to whether the dog clutch 6 is switched off or not (S14). If the dog clutch 6 is not switched off, the electric motor 5 is temporarily rotated in both the normal direction and the reverse direction (S15). At this time, the electric current value which is charged to the electric motor 5 is slightly larger than the electric current value is which corresponds to the frictional force in the electric motor 5 as shown in FIG. 3, whereby a torque to cancel the frictional force is generated. Therefore, in case where a torque in the normal direction of rotation is operating on the dog clutch 6 as a result of the counter driving by the rear wheels 4L, 4R, the torque which operates on the dog clutch 6 will become substantially zero by the driving of the electric motor 5 in the normal direction of rotation. In case, on the other hand, where a torque in the reverse direction of rotation is operating on the dog clutch 6, the torque which operates on the dog clutch 6 will become substantially zero by the driving of the electric motor 5 in the reverse direction of rotation. The switch-on locking of the dog clutch 6 will thus be released, and the movable dog 6b will be detached from the stationary dog 6a by the force of the spring, whereby the dog clutch 6 is switched off.

The above-described predetermined value VS2 is set so as to meet the following condition, i.e., VS1≦VS2≦Vmax, where Vmax is the rear-wheel rotational speeds which correspond to an allowable upper limit of rotational speed of the electric motor 5. The dog clutch 6 is thus switched off before the rear-wheel rotational speeds VR exceed the value Vmax.

Figure 4:
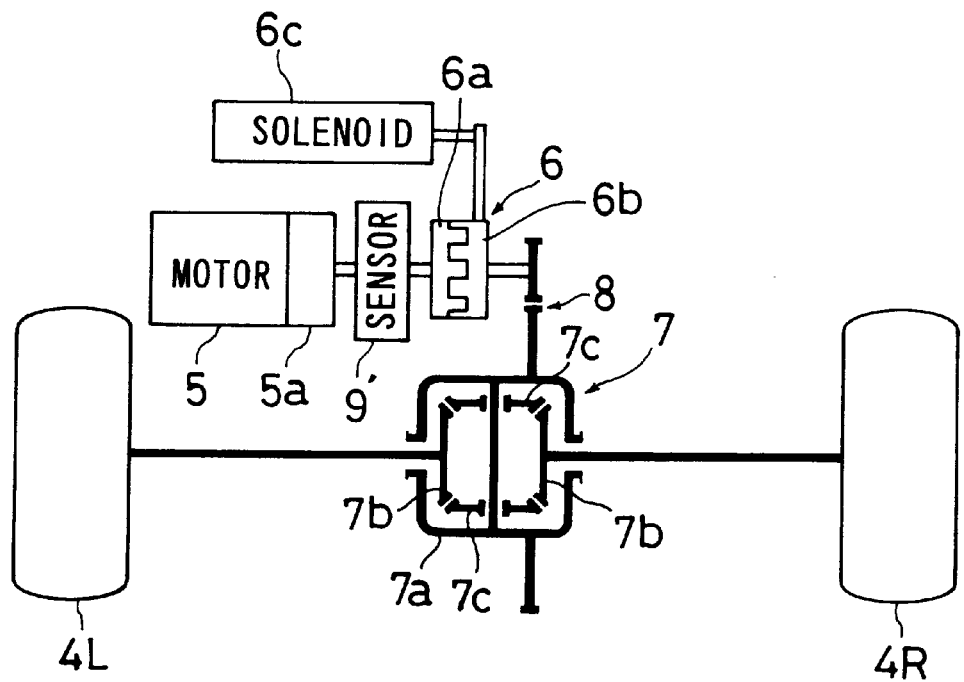
FIG. 4 is a skeleton diagram showing a second embodiment of the present invention.

When the dog clutch 6 is switched off, no torque is operated on the power transmission passage between the electric motor 5 and the rear wheels 4L, 4R once the driving of the electric motor 5 has been stopped. However, if the dog clutch 6 is switched on, the torque which corresponds to the frictional force in the electric motor 5 will operate on the power transmission passage. Therefore, the following arrangement may also be made. Namely, a torque sensor 9' as a clutch detecting means is provided at an appropriate location, e.g., between the electric motor 5 and the dog clutch 6 as shown in FIG. 4. Based on the signal from the torque sensor 9', the switching on and switching off of the dog clutch 6 may be discriminated.

Figure 5:
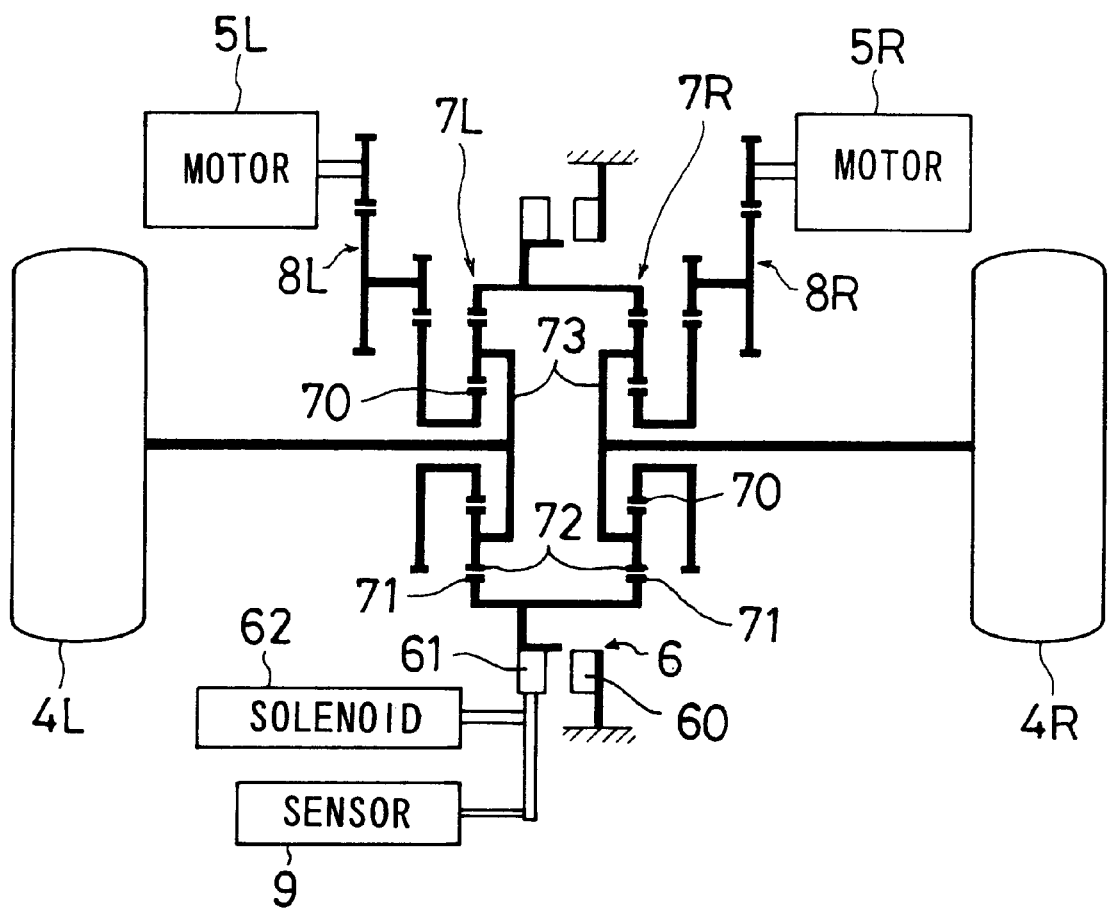
FIG. 5 is a skeleton diagram showing a third embodiment of the present invention.

FIG. 5 shows still another embodiment of the starting assistance device of the present invention. In this embodiment, there are provided a pair of left and right electric motors 5L, 5R and a pair of left and right differential gears 7L, 7R to drive the left and right rear wheels 4L, 4R.

Each of the differential gears 7L, 7R is constituted into a planetary type of reduction gear which comprises: a sun gear 70; a ring gear 71; and a carrier 73 which rotatably supports planetary pinions 72 which are engaged with both the gears 70, 71. Each of the electric motors 5L, 5R is coupled to the sun gear 70 of each of the differential gears 7L, 7R via respective gear trains 8L, 8R. Each of the left and right rear wheels 4L, 4R is coupled to the carrier 73 of each of the differential gears 7L, 7R. The ring gears 71, 71 of the left differential 7L and the right differential 7R are coupled to each other. The rotation of the ring gear 71 can be restrained by a dog clutch 6.

The dog clutch 6 is constituted by: a stationary dog 60 which is prevented from rotating; a movable dog 61 which is coupled to the ring gears 71 and which can be engaged with, and disengaged from, the stationary dog 60; and a solenoid 62 which moves backward the movable dog 61. When the solenoid 62 is energized, the movable dog 61 is engaged with the stationary dog 60. The dog clutch 6 is thus switched on to thereby restrain the rotation of the ring gear 71. When the electric charging to the solenoid 62 is stopped, the movable dog 61 is released from the stationary dog 60 by the urging force of a spring (not illustrated) which is built in the solenoid 62. The dog clutch 6 is thus switched off to thereby release the restraining of the ring gears 71.

When slipping occurs to the front wheels at the time of starting of the vehicle, the solenoid 62 is energized to thereby switch on the dog clutch 6. Also, each of the electric motors 5L, 5R is driven to rotate the sun gear 70 of each of the differential gears 7L, 7R. According to these operations, the carrier 73 of each of the differential gears 7L, 7R is rotated in a condition in which the ring gears 71 serve as a reaction force receiving member. The output torque of each of the electric motors 5L, 5R is thus transmitted to each of the left and right rear wheels 4L, 4R to thereby perform the starting assistance.

Once the vehicle has started, when the rotational speeds of the rear wheels have exceeded the predetermined value VS1 for judging whether the vehicle is at the time of starting or not as descried above, the energizing of the solenoid 62 is stopped. The dog clutch 6 is thus switched off and the driving of each of the electric motors 5L, 5R is stopped.

In this case, if the counter driving by the rear wheels 4L, 4R occurs, a torque which corresponds to the frictional forces in the electric motors 5L, 5R operate on the dog clutch 6 via the ring gears 71 which function as the reaction force receiving members. The dog clutch 6 thus sometimes becomes a switch-on locking state.

As a solution, in the present embodiment, the following arrangement has been made. Namely, a stroke sensor 9 which serves as a clutch detecting means is coupled to the movable dog 61. When the rear-wheel rotational speeds have exceeded the predetermined value VS2 which is similar to the above-described explanation, a discrimination is made based on the signal from the stroke sensor 9 as to whether the dog clutch 6 is switched off or not. If the dog clutch 6 is not switched off, the electric motors 5L, 5R are temporarily driven in both the normal direction and the reverse direction. A torque to cancel or offset the frictional forces in the electric motors 5L, 5R is thus generated. According to these operations, the switch-on locking of the dog clutch 6 is released. The movable dog 61 is thus disengaged from the stationary dog 60 by the spring force, whereby the dog clutch 6 is switched off.

Further, in the present embodiment, at the time of cornering of the vehicle, the electric motor on the side of the outer wheel, out of the left and right electric motors 5L, 5R, is rotated in the normal direction of rotation, and the electric motor on the side of the inner wheel is rotated in the reverse direction of rotation. For example, at the time of cornering toward the right, the electric motor 5L on the left side is rotated in the normal direction of rotation, and the electric motor 5R on the right side is rotated in the reverse direction of rotation. According to these operations, the sun gear 70 of the left differential gear 7L is rotated in the normal direction of rotation, and the carrier 73 thereof is rotated in the normal direction of rotation relative to the ring gear 71. The sun gear 70 of the right differential gear 7R is rotated in the reverse direction of rotation and the carrier 73 thereof is rotated in the reverse direction of rotation relative to the ring gear 71. In this case, a reaction force in the reverse direction of rotation is operated on the ring gear 71 of the left differential gear 71. A reaction force in the normal direction of rotation is operated on the ring gear 71 of the right differential gear 7R. However, since both the ring gears 71, 71 are coupled to each other, both the reaction forces are canceled or offset with each other. As a result, with the rotational speed of the ring gear 71 as a reference, the carrier 73 of the left differential gear 7L, i.e., the left rear wheel 4L, is accelerated, and the carrier 73 of the right differential gear 7R, i.e., the right rear wheel 4L, is decelerated. As a result, a driving force is added to the left rear wheel 4L which is an outer wheel, and a braking force is added to the right rear wheel 4R which is an inner wheel. A yawing moment to the right thus occurs, whereby the cornering is assisted.

In the embodiment as shown in FIG. 5, the stroke sensor 9 is used as the clutch detecting means. However, this clutch detecting means may also be constituted by a torque sensor for detecting the torque which operates on a suitable portion in a power transmission passage between the electric motors 5L, 5R and the rear wheels 4L, 4R, e.g., the ring gear 71.

Explanations have so far been made on embodiments in which the present invention is applied to the front-wheel-drive vehicle. The present invention can similarly be applied to the rear-wheel-drive vehicle.

As explained hereinabove, according to the present invention, even if the dog clutch is in a switch-on locking state, the dog clutch can be released to thereby switch off the dog clutch. The electric motor after the vehicle has started can be prevented from excessively rotating, thereby improving the durability of the electric motor.

It is readily apparent that the above-described starting assistance device for mounting on a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A starting assistance device for mounting on a vehicle in which either front wheels or rear wheels are driven by an engine and the remaining thereof are idler wheels, said device comprising:

an electric motor;

a dog clutch which is switched on at the time of starting of the vehicle to transmit an output torque of said electric motor to the idler wheels, wherein, after the vehicle has started, said electric motor ceases to be driven and said dog clutch is switched off;

clutch detecting means for detecting switching on and switching off of said dog clutch; and a temporary driving means for temporarily driving said electric motor in a direction to cancel a torque which operates on said dog clutch due to a frictional force in said electric motor, said temporary driving means said electric motor being performed when switching off of said dog clutch is not detected by said clutch detecting means even when the rotational speed of the idler wheels has exceeded a predetermined value after the starting of the vehicle.

2. A starting assistance device according to claim 1, wherein said temporary driving means drives said electric motor in a normal direction and in a reverse direction within a temporary driving time.

* * * * *